US011995508B2

(12) United States Patent
Kraus (10) Patent No.: US 11,995,508 B2
(45) Date of Patent: May 28, 2024

(54) DEVICE HAVING FUNCTIONAL COMPONENT AND A PLASTIC HOUSING ELEMENT, AND METHOD FOR VERIFYING THE AUTHENTICITY OF SUCH A DEVICE

(71) Applicant: SEMIKRON ELEKTRONIK GMBH & CO. KG, Nuremberg (DE)

(72) Inventor: Martin Kraus, Nuremberg (DE)

(73) Assignee: SEMIKRON ELEKTRONIK GMBH & CO. KG, Nuremberg (DE)

( * ) Notice: Subject to any disclaimer, the term of this patent is extended or adjusted under 35 U.S.C. 154(b) by 0 days.

(21) Appl. No.: 17/716,268

(22) Filed: Apr. 8, 2022

(65) Prior Publication Data
US 2022/0343091 A1 Oct. 27, 2022

(30) Foreign Application Priority Data
Apr. 26, 2021 (DE) .................... 10 2021 110 607.9

(51) Int. Cl.
*G06K 7/14* (2006.01)
*B29C 45/00* (2006.01)
*B29C 45/16* (2006.01)
*G06K 19/06* (2006.01)
*B29L 31/34* (2006.01)

(52) U.S. Cl.
CPC ........ *G06K 7/1404* (2013.01); *B29C 45/0053* (2013.01); *B29C 45/16* (2013.01); *G06K 19/06046* (2013.01); *B29L 2031/3481* (2013.01)

(58) Field of Classification Search
CPC ............ G06K 19/10; G06K 19/06046; G06K 19/083; G06K 19/086; G06K 7/1404
See application file for complete search history.

(56) References Cited

U.S. PATENT DOCUMENTS 6,047,068 A * 4/2000 Rhelimi ............... G06Q 20/341
380/46
6,632,654 B1 * 10/2003 Gebrian ........... G01N 35/00029
422/561
(Continued)

FOREIGN PATENT DOCUMENTS

DE 102019201529 A1 8/2020

OTHER PUBLICATIONS

DE 10 2021 110 607.9, German Search Report dated Feb. 15, 2022, 8 pages—German, 8 pages—English, Certificate of Translation (Total 9 pages).
(Continued)

*Primary Examiner* — Daniel I Walsh
(74) *Attorney, Agent, or Firm* — Andrew F. Young; Nolte Lackenbach Siegel (57) ABSTRACT

A functional component and having a partial plastic housing element with a plastic housing wall, the plastic housing wall having a device identification region integrated into the plastic housing wall and thus realizing a constituent part of the plastic housing wall. The device identification region comprising identification elements integrated into the plastic housing wall, those identification elements that realize part of a surface of the plastic housing wall realizing device identification elements, the device identification region being realized individually for the device by the device identification elements, such that the device can be unambiguously identified by means of the device identification region.

17 Claims, 5 Drawing Sheets

(56) References Cited

U.S. PATENT DOCUMENTS

| | | | | |
|---|---|---|---|---|
| 6,928,552 B1* | 8/2005 | Mischenko | ............. | G07F 7/122 726/22 |
| 2001/0033012 A1* | 10/2001 | Kommerling | ........ | G06K 19/073 257/679 |
| 2003/0085474 A1* | 5/2003 | Frankowsky | ........... | H01L 24/11 257/E21.511 |
| 2003/0136837 A1* | 7/2003 | Amon | ....................... | G07D 7/20 340/5.8 |
| 2005/0064435 A1* | 3/2005 | Su | ........................... | B82Y 5/00 435/7.1 |
| 2005/0140497 A1* | 6/2005 | Chiviendacz | ........ | B42D 25/305 340/5.67 |
| 2006/0086791 A1* | 4/2006 | Austin | ................... | G06K 19/14 235/385 |
| 2006/0118642 A1* | 6/2006 | Latka | ..................... | G06K 19/14 235/492 |
| 2007/0087756 A1* | 4/2007 | Hoffberg | .......... | G06Q 10/06375 455/450 |
| 2007/0118822 A1* | 5/2007 | Ito | ............................. | G09F 3/00 382/209 |
| 2007/0183045 A1* | 8/2007 | Schilling | ................ | B42D 25/29 359/569 |
| 2008/0094807 A1* | 4/2008 | Hiew | ...................... | G06F 21/78 29/829 |
| 2008/0210757 A1* | 9/2008 | Burden | ............ | G06K 19/06187 428/800 |
| 2008/0218799 A1* | 9/2008 | Hiew | ..................... | G06F 1/1632 358/1.16 |
| 2009/0093136 A1* | 4/2009 | Hiew | ..................... | H01R 12/57 439/55 |
| 2009/0218401 A1* | 9/2009 | Moran | ...................... | G09F 3/10 235/487 |
| 2010/0195916 A1* | 8/2010 | Blondiaux | ........... | B42D 25/445 977/773 |
| 2010/0200649 A1* | 8/2010 | Callegari | ................ | G06F 17/00 235/468 |
| 2011/0164748 A1* | 7/2011 | Kohlert | ................ | G06K 19/086 428/221 |
| 2011/0312841 A1* | 12/2011 | Silverbrook | ............. | C12Q 1/68 506/40 |
| 2013/0232830 A1* | 9/2013 | Barisic | ...................... | G09F 3/02 40/299.01 |
| 2014/0116911 A1* | 5/2014 | Bryant | .................... | B41M 1/34 206/459.5 |
| 2014/0138839 A1* | 5/2014 | Ha | ....................... | H01L 23/3735 257/773 |
| 2014/0178640 A1* | 6/2014 | Jauzein | .................. | C09D 11/50 427/256 |
| 2014/0306010 A1* | 10/2014 | Prokop | .................. | A61J 3/007 235/440 |
| 2016/0050768 A1* | 2/2016 | Chen | ........................ | H05K 7/06 361/728 |
| 2018/0193831 A1* | 7/2018 | Hopper | ................... | F04B 43/00 |
| 2018/0286607 A1* | 10/2018 | Strauss | ............ | G06K 19/07732 |
| 2018/0331827 A1* | 11/2018 | Godon | ................... | G09C 1/00 |
| 2019/0139909 A1* | 5/2019 | Bush | ................ | H04L 9/3278 |
| 2020/0277600 A1* | 9/2020 | Zhang | .................... | C12N 15/11 |
| 2020/0334514 A1* | 10/2020 | Chen | ........................ | B41M 3/14 |
| 2021/0120193 A1* | 4/2021 | Swager | ............... | G01N 21/6456 |
| 2021/0342617 A1* | 11/2021 | Kudo | ....................... | G06T 7/73 |
| 2021/0391229 A1* | 12/2021 | Düsel | ..................... | H01L 24/72 |
| 2021/0402822 A1* | 12/2021 | Samid | ................... | B42D 25/20 |
| 2022/0343091 A1* | 10/2022 | Kraus | ................ | B29C 45/0053 |
| 2022/0406745 A1* | 12/2022 | Pavlicek | ........... | H01L 23/4985 |
| 2022/0415730 A1* | 12/2022 | Reiter | ...................... | H05K 3/301 |
| 2023/0050030 A1* | 2/2023 | Cobb | ...................... | G06F 7/588 |
| 2023/0054812 A1* | 2/2023 | Pai | ....................... | H01R 12/585 |
| 2023/0079413 A1* | 3/2023 | Otremba | ................ | H01L 23/473 257/713 |

OTHER PUBLICATIONS

DE 10 2021 110 607.9, Filed response to examination dated May 23, 2022, 11 pages—German, 11 pages—English, Certificate of Translation (Total 23 pages).

* cited by examiner

DEVICE HAVING FUNCTIONAL COMPONENT AND A PLASTIC HOUSING ELEMENT, AND METHOD FOR VERIFYING THE AUTHENTICITY OF SUCH A DEVICE

CROSS REFERENCE TO RELATED APPLICATIONS

This application relates to and claims priority to DE 10 2021 110 607.9 filed Apr. 26, 2021, the entire contents of which are incorporated herein fully by reference.

FIGURE SELECTED FOR PUBLICATION

FIG. 9

BACKGROUND OF THE INVENTION

Field of the Invention

The invention relates to a device having a functional component and having a plastic housing element that realizes at least part of a housing for the functional component. Furthermore, the invention relates to a method for producing a plastic housing element for such a device, to a method for producing such a device, and to the use of device identification elements for unambiguous identification of such a device.

Description of the Related Art

In order to enable verification of the authenticity of a device, and thus to be able to identify counterfeits of devices, it is customary in technology to affix to a housing of the device a sticker that is supposed to be difficult to counterfeit, e.g., a sticker provided with a hologram. Furthermore, it is known to provide the housing with a laser marking.

It has been shown in practice, however, that such stickers or laser markings are also counterfeited.

ASPECTS AND OBJECTS OF THE INVENTION

One alternative aspect and object of the invention is to enable unambiguous identification of a device having a functional component and having a plastic housing element that realizes at least part of a housing for the functional component.

This object is achieved by a device having a functional component and having a plastic housing element that realizes at least part of a housing for the functional component, the plastic housing element having a plastic housing wall, the plastic housing wall having a device identification region integrated into the plastic housing wall and thus realizing a constituent part of the plastic housing wall, the device identification region comprising identification elements integrated into the plastic housing wall, those identification elements that realize part of a surface of the plastic housing wall realizing device identification elements, the device identification region being realized individually for the device by means of the device identification elements, such that the device can be unambiguously identified by means of the device identification region.

According to another alternative object and aspect of the present invention, there is provided a functional component and having a partial plastic housing element with a plastic housing wall, the plastic housing wall having a device identification region integrated into the plastic housing wall and thus realizing a constituent part of the plastic housing wall. The device identification region comprising identification elements integrated into the plastic housing wall, those identification elements that realize part of a surface of the plastic housing wall realizing device identification elements, the device identification region being realized individually for the device by the device identification elements, such that the device can be unambiguously identified by means of the device identification region. The invention additionally relates to a method for producing a plastic housing element for such a device, to a method for producing such a device, and to the use of device identification elements for unambiguous identification of such a device.

It proves to be advantageous if the device identification elements can be recognized optically, in particular by a human eye and/or a camera, in particular by a camera of a mobile communication device, as the device identification elements are then particularly easy to recognize.

Furthermore, it proves to be advantageous if, at least in the case of some of the device identification elements, regions of the device identification elements protrude from the region of the rest of the plastic housing wall surrounding them in each case. On the one hand, this enables the device identification elements to be captured three-dimensionally, which increases the counterfeit security of the device identification region. Furthermore, this makes it easier to recognize a counterfeit device identification region, e.g., one that is merely printed on, since a customs officer, for example, receives tactile feedback upon passing a finger over the device identification elements.

Furthermore, it proves to be advantageous if the identification elements are realized as particles distributed, preferably randomly, in the device identification region. A very high number of different device identification regions can thus be easily produced, or generated.

In this regard, it proves to be advantageous if at least two different realizations of particles are present, the at least two different realizations of particles differing in shape and/or size and/or color. A very high number of different device identification regions can thus be very easily produced, or generated.

Furthermore, it proves to be advantageous if the device identification elements are realized as differently colored plastic regions that realize part of the plastic housing wall and preferably differ in shape and/or size. A very high number of different device identification regions can thus be easily produced, or generated.

It also proves to be advantageous if the device, in particular the plastic housing element, is provided with a device identification character string, which in particular is realized as a serial number of the device. The additional marking of the device with the device identification character string, in conjunction with the device identification region, increases the counterfeit security.

The device may be, for example, a power semiconductor module, and the functional component may be realized as a substrate having conductor tracks on which power semiconductor components are arranged.

Furthermore, this object is achieved by a method for verifying the authenticity of a device according to the invention, comprising the following method steps a) receiving identification data of the device that have been ascertained on the basis of the device identification elements by means of a capture device, b) ascertaining, on the basis of a comparison of the identification data with stored original identification data from produced original devices, whether the device is a counterfeit.

It proves to be advantageous if in method step a) a device identification character string is present, the device identification character string is additionally received, and in method step b) the ascertaining of whether the device is a counterfeit is effected on the basis of a comparison of the identification data with original identification data of produced original devices and on the basis of a comparison of the device identification character string with original-device identification character strings assigned to the original identification data. The additional marking of the device with a device identification character string, in conjunction with the device identification region, increases the counterfeit security.

Furthermore, it proves to be advantageous if, in method step b), the comparison of the identification data with the original identification data is effected by ascertaining a coding character string on the basis of the identification data and comparing this with coding character strings ascertained from original identification data.

Furthermore, it proves to be advantageous if the following further method step is executed after method step b):

c) transmitting the result, as to whether the device is a counterfeit, to the capture device.

Furthermore, it proves to be advantageous if method steps a) and b) are performed automatically by a computing means not belonging to the capture device 10. The verification of the authenticity of a device can thus be performed in a particularly efficient manner.

Furthermore, it proves to be advantageous if the capture device, or at least a part of the capture device, is realized as a mobile communication device, in particular as a smartphone or tablet. Such a capture device is widespread all over the world, such that all over the world the authenticity of devices can be easily verified by means of the method according to the invention.

It also proves to be advantageous if method steps a) and b) are performed by the capture device. Thus, all over the world the authenticity of devices can be easily verified by means of the method according to the invention, irrespective of whether the capture device has a communication connection, in particular to the Internet.

Furthermore, this object is achieved by a method for producing a plastic housing element for a device according to the invention, comprising the following method step:

injection-molding the plastic housing element by means of a plastic injection-molding machine, such that a plastic housing wall of the plastic housing element is realized, identification elements being concomitantly injected into the plastic housing wall, in a region of the plastic housing wall, for the purpose of realizing a device identification region integrated into the plastic housing wall and realizing a constituent part of the plastic housing wall, those identification elements that realize part of a surface of the plastic housing wall realizing device identification elements, the device identification region being realized individually for the device by means of the device identification elements, such that the device can be unambiguously identified by means of the device identification region.

It proves to be advantageous if a surface layer is removed, in particular by abrasion, in the device identification region, in a further method step b) following method step a). This facilitates the optical recognition of the device identification elements.

Furthermore, this object is achieved by a method for producing a device according to the invention, this method comprising the method for producing a plastic housing element for the device, comprising the following further method steps.

providing a functional component, arranging the plastic housing element and the functional component in relation to each another in such a manner that the plastic housing element realizes at least part of a housing for the functional component.

Furthermore, this object is achieved by use of device identification elements integrated into a plastic housing wall of a plastic housing element of a device according to the invention, for unambiguous identification of the device.

Advantageous realizations of the device are disclosed in a manner similar to advantageous realizations of the methods or of the use of device identification elements for unambiguous identification of the device, and vice versa.

The above and other aspects, features, objects, and advantages of the present invention will become apparent from the following description read in conjunction with the accompanying drawings, in which like reference numerals designate the same elements.

DETAILED DESCRIPTION OF THE PREFERRED EMBODIMENTS

Reference will now be made in detail to embodiments of the invention. Wherever possible, same or similar reference numerals are used in the drawings and the description to refer to the same or like parts or steps. The drawings are in simplified form and are not to precise scale. The word 'couple' and similar terms do not necessarily denote direct and immediate connections, but also include connections through intermediate elements or devices. For purposes of convenience and clarity only, directional (up/down etc.) or motional (forward/back, etc.) terms may be used with respect to the drawings. These and similar directional terms should not be construed to limit the scope in any manner. It will also be understood that other embodiments may be utilized without departing from the scope of the present invention, and that the detailed description is not to be taken in a limiting sense, and that elements may be differently positioned, or otherwise noted as in the appended claims without requirements of the written description being required thereto.

Figure 1:
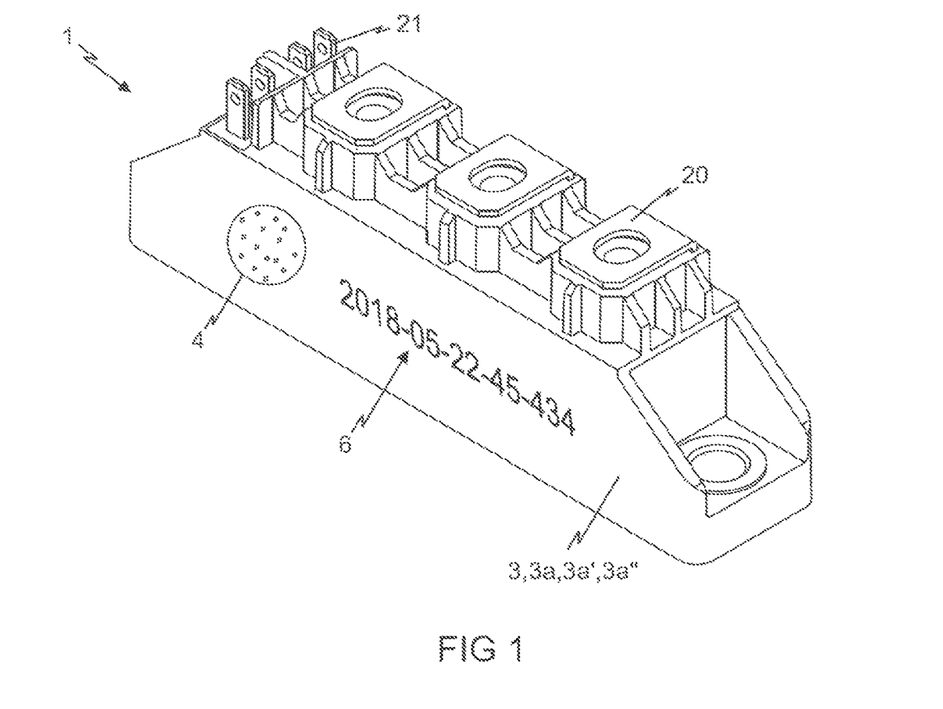
FIG. 1 Shows a perspective view of a device according to the invention.
Figure 2:
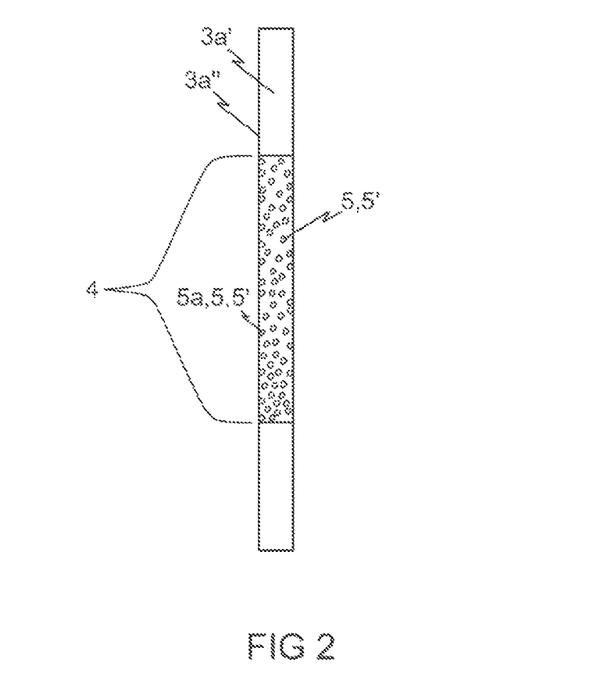
FIG. 2 Shows a sectional view of a plastic housing wall of a device according to the invention.
Figure 3:
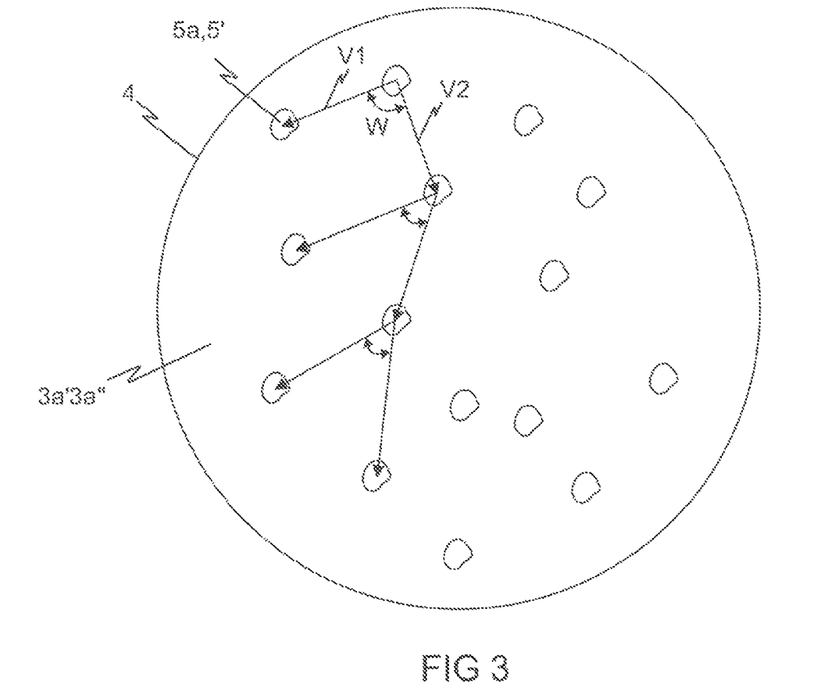
FIG. 3 Shows a top view of a realization of a device identification region of a device according to the invention.
Figure 8:
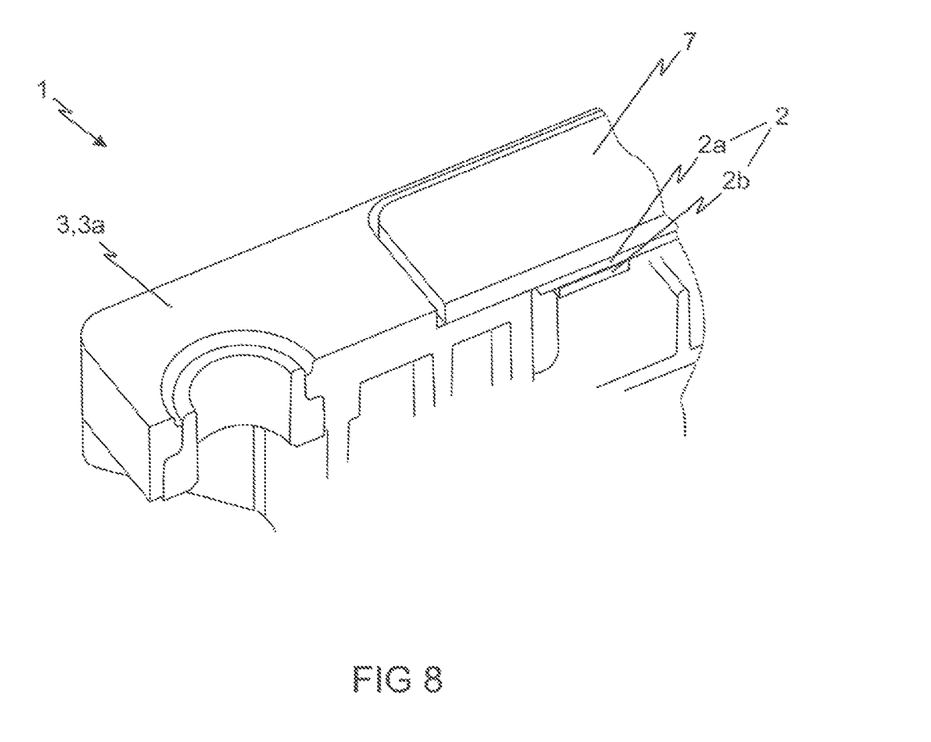
FIG. 8 Shows a perspective detail view of a device according to the invention.

FIG. 1 shows a perspective view of a device 1 according to the invention, and FIG. 8 shows a perspective detail view of the device 1 according to the invention. FIG. 2 shows a sectional view of a plastic housing wall 3a' of the device 1 according to the invention, the section being through a device identification region 4 of the device 1 according to the invention. FIG. 3 shows a top view of a realization of the device identification region 4.

The device 1 according to the invention has a functional component 2 and a plastic housing element 3a that realizes at least pan of a housing 3 for the functional component 2, the plastic housing element 3a having a plastic housing wall 3a'. In the context of the exemplary embodiments, the device 1 is a power semiconductor module, and the functional component 2 is realized as a substrate 2a basing conductor tracks on which power semiconductor components 2b are arranged and contacted in an electrically conductive manner to the conductor tracks. The substrate 2a may be realized, for example, as a direct copper bonded substrate (DCB substrate), as an active metal brazing substrate (AMB substrate) or as an insulated metal substrate (IMS). The respective power semiconductor device 2b is preferably in the form of a power semiconductor switch or a diode. The power semiconductor switches in this case are generally in the form of transistors, such as IGBTs (insulated-gate bipolar transistor) or MOSFETs (metal oxide semiconductor field-effect transistor), or in the form of thyristors. The substrate 2a is preferably arranged on a base plate 7 of the power semiconductor module. The power semiconductor components 2b are preferably electrically interconnected to form a half-bridge circuit. In the exemplary embodiments, the power semiconductor module additionally comprises electrical load current terminals 20 and preferably control terminals 21 for controlling power semiconductor switches of the power semiconductor module.

The plastic housing wall 3a' has a device identification region 4 integrated into the plastic housing wall 3a' and thus forming a constituent part of the plastic housing wall 3a'. The device identification region 4 has identification elements 5 integrated into the plastic housing wall 3a', those identification elements 5 that realize part of a surface 3a" of the plastic housing wall 3a' realizing device identification elements 5a (see FIG. 2 to FIG. 7). The identification elements 5 are injected into the plastic housing element 3a', in the device identification region 4, during production of the plastic housing element 3a, for example by means of multi-component injection molding. The distribution, arrangement, position, shape and/or color of the device identification elements 5a in this case are preferably obtained in a random manner, such that the device identification regions 4 of successively produced plastic housing elements 3a all differ from one another in a reliable and mathematically non-calculable manner, even in the case of very large quantities. By means of the device identification elements 5a, the device identification region 4 is realized individually for the device 1, such that the device 1 can be unambiguously identified by means of the device identification region 4. In the invention, the unique identification feature is formed by a region of the plastic housing element 3a, namely the device identification region 4 itself, and is thus cannot be counterfeited in an economically feasible manner, since for counterfeiting the device identification region 4 would have to be cut out of the plastic housing element of the original device and inserted into the plastic housing element of the counterfeited device, and moreover the seams must not be visible.

The device identification elements 5a can preferably be recognized optically, in particular by a human eye and/or a camera, in particular by a camera of a mobile communication device. The device identification elements 5a are of a sufficient size for this purpose.

Figure 7:
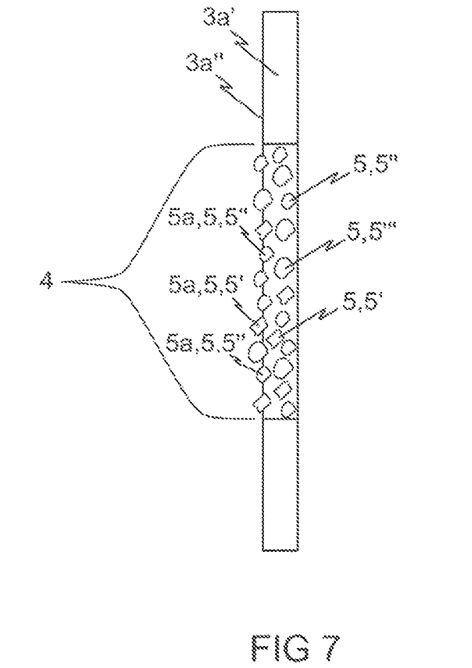
FIG. 7 Shows a further sectional view of a plastic housing wall of a device according to the invention.

As represented by way of example in FIG. 7, in at least some of the device identification elements 5a regions of the device identification elements 5a may protrude from the region of the rest of the plastic housing wall 3a' surrounding them in each case. On the one hand, this enables the device identification elements 5a to be captured three-dimensionally, which increases the counterfeit security of the device identification region 4. Furthermore, the counterfeit security of the device identification region 4 is further enhanced, since the user receives a tactile feedback upon passing a finger over the device identification elements 5a.

The identification elements 5 are realized, as represented by way of example in FIGS. 2 to 7, as particles 5', 5" or 5'" distributed, preferably randomly, in the device identification region 4. The particles 5', 5" or 5'" have a higher melting temperature than the plastic of the plastic housing wall 3a' surrounding them, such that they do not mix with the plastic of the plastic housing wall 3a' surrounding them during injection molding of the plastic housing element 3a. The particles 5', 5" or 5'" may be composed, for example, of a plastic that has a higher melting temperature than the plastic of the rest of the plastic housing wall 3a'. However, the particles may of course also be made of a material other than plastic.

Figure 4:
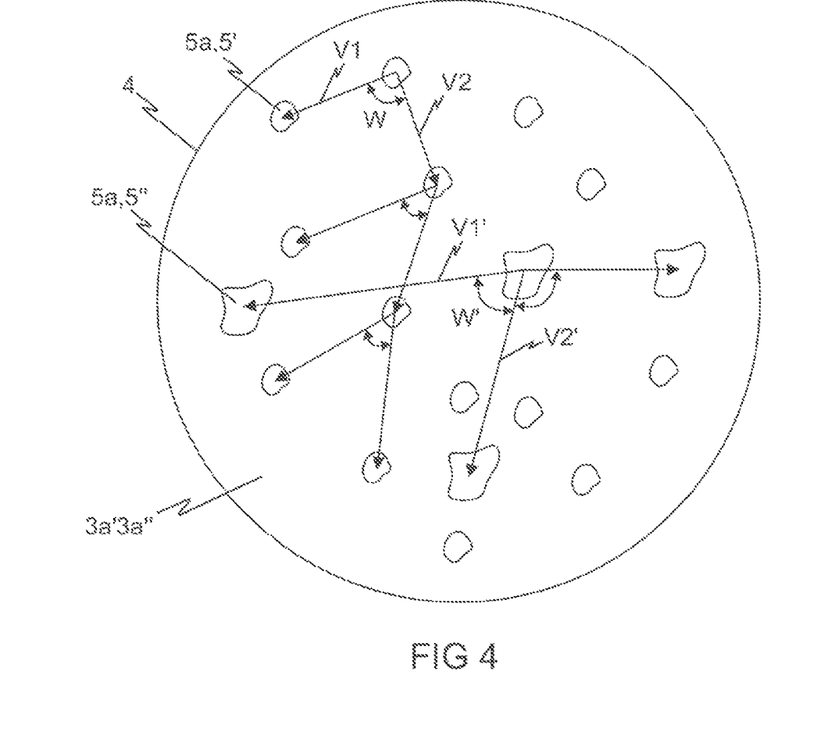
FIG. 4 Shows a top view of a further realization of a device identification region of a device according to the invention.
Figure 5:
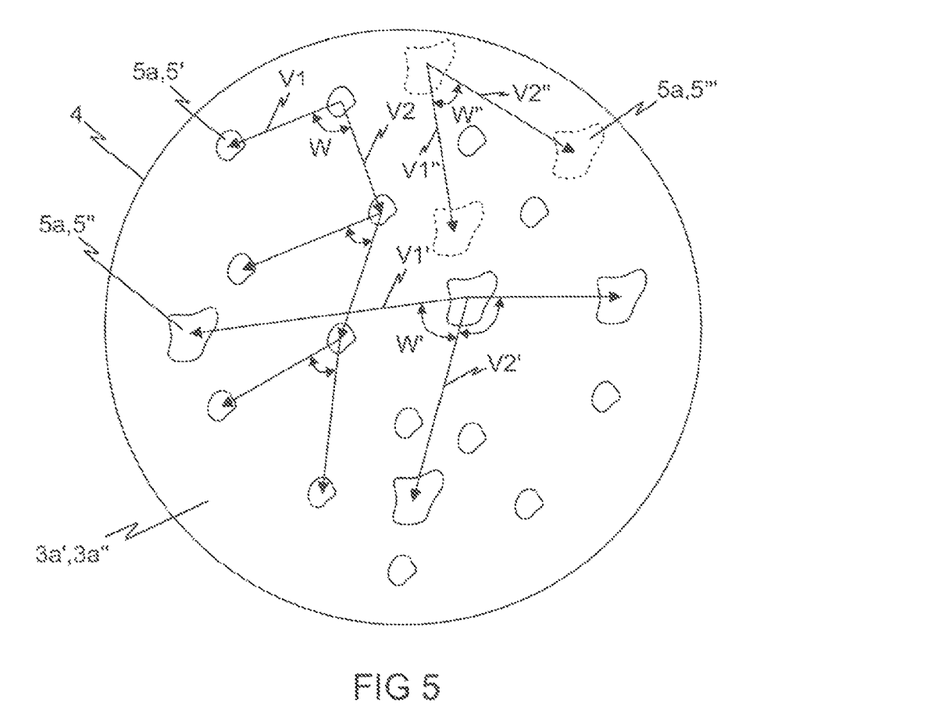
FIG. 5 Shows a top view of a further realization of a device identification region of a device according to the invention.

As represented by way of example in FIG. 4 and FIG. 5, preferably at least two different realizations of particles (5', 5", 5'") are present, the at least two different realizations of particles (5', 5", 5'") differing in shape and/or size and/or color. In FIG. 5, the particles 5" differ from the particles 5" by their color, which in FIG. 5 is represented by a dashed line. In FIG. 4, in contrast to FIG. 3, there are two different types of particles 5' and 5" present.

Figure 6:
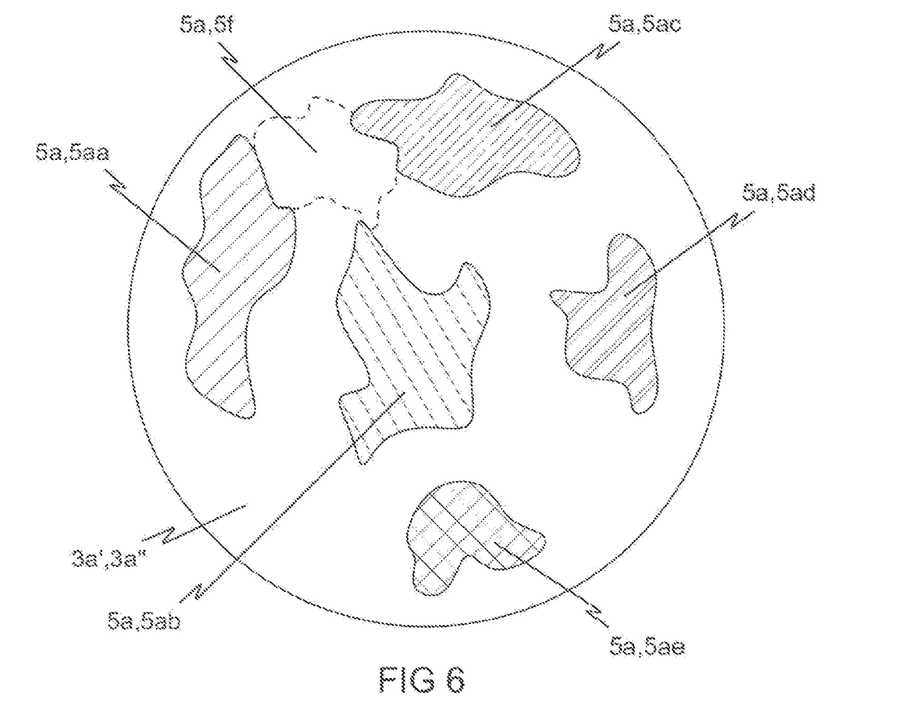
FIG. 6 Shows a top view of a further realization of a device identification region of a device according to the invention.

Alternatively, the device identification elements 5a, as represented by way of example in FIG. 6, may be realized as differently colored plastic regions 5aa, 5ab, 5ac, 5ad, 5ae, 5af that realize part of the plastic housing wall 3a' and preferably differ in shape and/or size. Differently colored plastic regions may also be produced in this case by mixing the color of adjacent plastic regions. In FIG. 6, for example, the color of the plastic region 5f is determined by the color of the plastic regions 5aa, 5ab and 5ac adjacent to the plastic region 5f. It is be noted in this case that, in the context of the invention, differently colored plastic regions are also understood to include different color gradients and/or different color patterns (e.g., stripe patterns) and/or different color intensities.

The device 1, in particular the plastic housing element 3a, is preferably provided with a device identification character string 6, which is realized in particular as the serial number of the device 1. The additional marking of the device 1 with the device identification character string 6, in conjunction with the device identification region 4, increases the counterfeit security.

Figure 9:
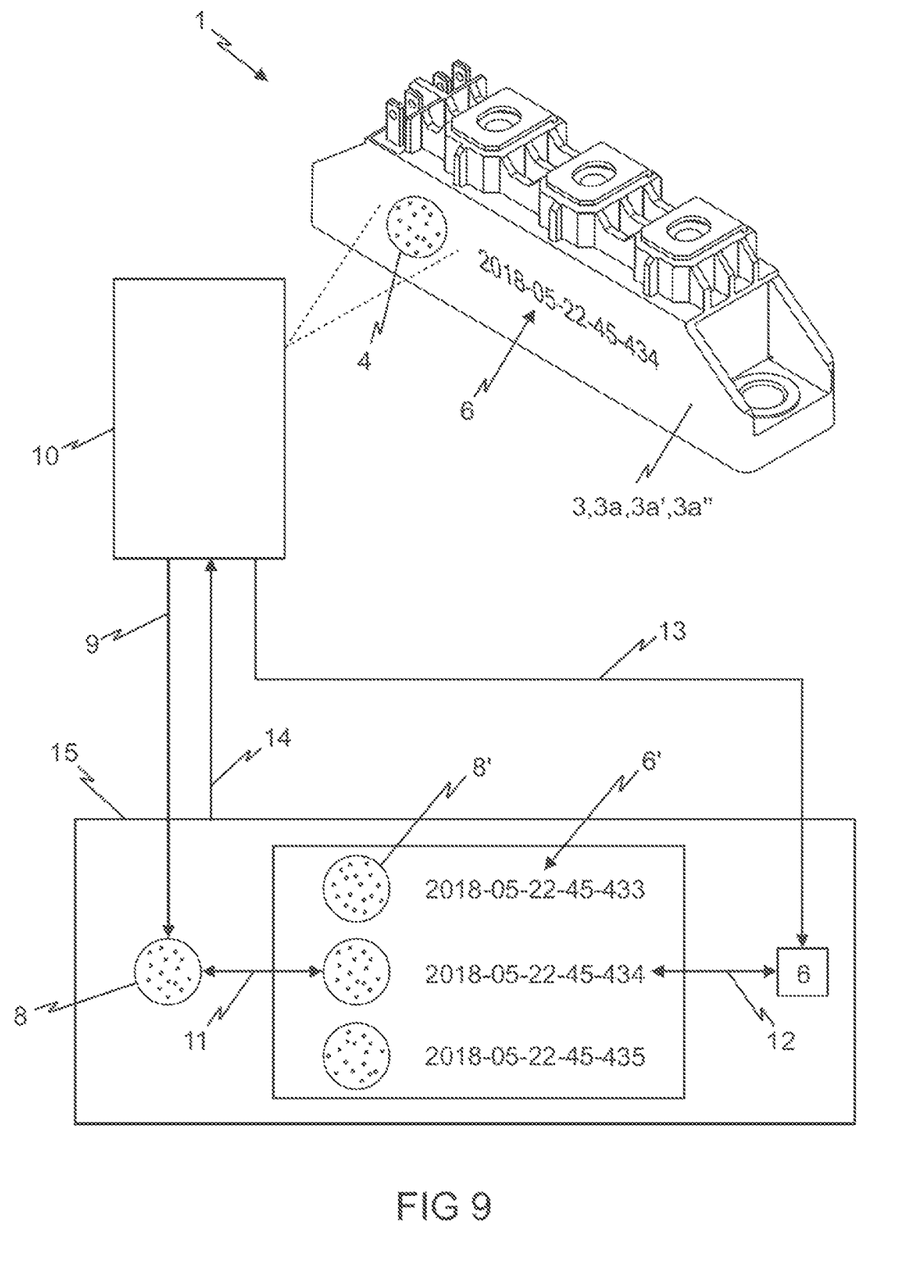
FIG. 9 Shows an arrangement for executing a method for verifying the authenticity of a device according to the invention.

A method for verifying the authenticity of the device 1 is described below. FIG. 9 shows an arrangement for executing this method.

In a method step a), identification data 8 of the device 1, that have been ascertained on the basis of the device identification elements 4 by means of a capture device 10, are received 9. The capture device 10 or at least a part of the capture device 10 is preferably realized as a mobile communication device, in particular as a smartphone or tablet. For the purpose of ascertaining the identification data 8, the device identification region 4 is preferably photographed by the capture device 10. The photograph, or more precisely the respective photograph file, is then transmitted, preferably, by the capture device 10, to a computing means 15, for example by means of an app running on the capture device 15, or for example by means of an e-mail. In the context of the exemplary embodiment, the identification data 8 are received by a computing means 15 not belonging to the capture device 10, which is represented by an arrow 9 in FIG. 9. In the simplest case, the identification data 8 are in the form of a photograph file.

In a subsequent method step b), it is ascertained, on the basis of a comparison 11 of the identification data 8 with stored original identification data 8' from produced original devices, whether the device 1 is a counterfeit. To create the original identification data 8', the device identification regions 4 of original devices, or of original plastic housing elements, are photographed and the corresponding photographs are stored as original identification data 8'. In the simplest case, the comparison 11 of the identification data 8 with stored original identification data 8' is performed by a person, by visual comparison of the identification data 8 with stored original identification data 8' on a screen. Preferably, method steps a) and b) are performed automatically by the computing device 15 not belonging to the capture device 10, e.g., by a server, a PC or by a computing system. In method step b), the comparison 11 of the identification data 8 with the original identification data 8' is preferably affected in that a coding character string is ascertained, on the basis of the identification data 8, and is compared with coding character strings ascertained from original identification data 8'. The ascertaining of a coding character sequence on the basis of the identification data 8 may be effected, as indicated by way of example in FIGS. 3 to 5, for example on the basis of vectors V1, V2, V1', V2', V1", V2", in particular their amounts and angles W, W', W" occurring relative to one another, connecting die device identification elements 5a. The ascertaining of a coding character string on the basis of the identification data 8 may be out on the computing means 15 not belonging to the capture device 10.

However, the ascertaining of a coding character string, on the basis of the identification data 8, may also be effected in advance on another means, in particular on the capture device 10, and this can then be transmitted as identification data 8, in particular to the computing means 15. In this case, in method step a), the coding character string is received as identification data 8 of the device 1. In the context of the invention, both the identification data 8 and the original identification data 8' may also already be in the form of a coding character string.

In method step a), the device identification character string 6 is preferably also received, if present, this being indicated by an arrow 13 in FIG. 9. In method step b), it is then preferably ascertained whether the device 1 is a counterfeit on the basis of a comparison 11 of the identification data 8 with original identification data 8' of produced original devices and on the basis of a comparison 12 of the device identification character string 6 with original-device identification character strings 6' assigned to the original identification data 8'. The device identification character string 6 may, for example, be entered into the capture device 10 by a user of the capture device 10 and transmitted from the capture device 10 to the computing means 15.

In a method step c), which preferably follows method step b), the result as to whether the device 1 is a counterfeit is transmitted to the capture device 10, this being represented by an arrow 14 in FIG. 9.

It is to be noted that method steps a) and b) may also be performed by the capture device 10, in which case in method step a) the receiving of identification data of the device 1 is effected by a computing means integrated in the capture device 10.

A method for producing a plastic housing element 3a for the device 1 is described below.

In a method step a), the plastic housing element 3a is injection-molded by means of a plastic injection molding machine, such that a plastic housing wall 3a' of the plastic housing element 3a is realized. In order to realize a device identification region 4 integrated into the plastic housing wall 3a' and realizing a constituent part of the plastic housing wall 3a', identification elements 5 are concomitantly injected into the plastic housing wall 3a', in a region of the plastic housing wall 3a', those identification elements 5 that realize part of a surface 3a" of the plastic housing wall 3a' realizing device identification elements 5a'. By means of the device identification elements 5a', the device identification region 4 is realized individually for the device 1, such that the device 1 can be unambiguously identified by means of the device identification region 4. The injection molding of the plastic housing element 3a is preferably effected by means of multi-component injection molding, in particular, for example, by means of a core retraction technique, a sandwich method, co-injection or marbling.

The plastic from which the plastic housing wall 3a' in the device identification region 4 is made and in which the identification elements 5 are integrated is preferably the same plastic as the plastic from which the rest of the plastic housing wall 3a' is made.

In an optionally subsequent method step b), a surface layer may be removed, in particular by abrasion, in the device identification region 4.

A method for producing the device 1 is described below, this method comprising the method, described above, for producing the plastic housing element 3a.

In a subsequent further method step c), the functional component 2 is provided.

In a subsequent further method step d), the plastic housing element 3a and the functional component 2 are arranged in relation to each other in such a manner that the plastic housing element 3a realizes least part of a housing 3 for the functional component 2.

The invention uses device identification elements 5a integrated into the plastic housing wall 3a' of the plastic housing element 3a of the device 1, for unambiguous identification of the device 1.

Also, the inventors intend that only those claims which use the specific and exact phrase "means for" are intended to be interpreted under 35 USC 112. The structure herein is noted and well supported in the entire disclosure. Moreover, no limitations from the specification are intended to be read into any claims, unless those limitations are expressly included in the claims.

Having described at least one of the preferred embodiments of the present invention with reference to the accompanying drawings, it will be apparent to those skills that the invention is not limited to those precise embodiments, and that various modifications and variations can be made in the presently disclosed system without departing from the scope or spirit of the invention. Thus, it is intended that the present disclosure cover modifications and variations of this disclosure provided they come within the scope of the appended claims and their equivalents.

What is claimed is:

1. A power semiconductor module device comprising:
a functional component having a plastic housing element that includes at least part of a housing for the functional component;
the function component being a substrate having conductor tracts on which power semiconductor components are arranged and contacted in an electrically conductive manner to the conductor tracts;
the plastic housing element having a plastic housing wall;
the plastic housing wall having a device identification region integrated into the plastic housing wall and being a constituent part of the plastic housing wall;
the device identification region further comprising:
a plurality of identification elements integrated into the plastic housing wall;
the identification elements are realized as a plurality of particles randomly distributed in the device identification region;
said identification elements include a portion of a surface of the plastic housing wall including the device identification elements;
the device identification region being individually specific for the device by means of the device identification elements, such that the device can be unambiguously identified by the device identification region;
at least one region of at least one of said plurality of device identification elements protrudes from the device identification region of the of the plastic housing wall surrounding them; and
wherein a determination of a coding character sequence occurs on the basis of the device identification elements having connecting vectors, the amounts and angles of which relative to one another allow the determination of identification data.

2. The device, according to claim 1, wherein:
the device identification elements are recognized optically, by at least one of a human eye, a camera, and a camera of a mobile communication device.

3. The device according to claim 2, wherein:
at least two different realizations of said plurality of particles are present, the at least two different realizations of said plurality of particles differing in at least one of shape, size, and color.

4. The device, according to claim 3, wherein:
the device identification elements include differently colored plastic regions that form part of the plastic housing wall and differ in at least one of shape and size.

5. The device, according to claim 2, wherein:
the plastic housing element includes a device identification character string; and
said device identification character string includes at least a designated serial number of the device.

6. The device, according to claim 1, authenticated by a method comprising the following steps:
receiving identification data of the device that has been ascertained on the basis of the device identification elements by means of a capture device;
ascertaining, on the basis of a comparison of the identification data with stored original identification data from previously produced original devices, whether the device is a counterfeit.

7. The device, according to claim 1, manufactured by a process comprising the following steps:
injection-molding the plastic housing element by means of a plastic injection-molding machine, such that a plastic housing wall of the plastic housing element is realized;
said identification elements are concomitantly injected into the plastic housing wall, in a region of the plastic housing wall, for the purpose of realizing said device identification region integrated into the plastic housing wall and realizing a constituent part of the plastic housing wall;
wherein those said identification elements that realize part of a surface of the plastic housing wall further being said device identification elements; and
the device identification region being realized individually for the device by means of the device identification elements, such that the device can be unambiguously identified by means of the device identification region.

8. A method for verifying the authenticity of a device according to claim 1, comprising the following steps:
a) providing said device according to claim 1;
b) receiving identification data of the device that has been ascertained on the basis of the device identification elements by means of a capture device;
c) ascertaining, on the basis of a comparison of the identification data with stored original identification data from previously produced original devices, whether the device is a counterfeit.

9. The method according to claim 8, wherein:
the device identification elements are recognized optically, by at least one of a human eye, a camera, and a camera of a mobile communication device;
the plastic housing element includes a device identification character string;
said device identification character string includes at least a designated serial number of the device;
the method further comprising the steps of:
additionally receiving the device identification character string;
and in the method step b) the ascertaining of whether the device is a counterfeit is effected on the basis of conducting said comparison of the identification data with original identification data of produced original devices and on the basis of a comparison of the device identification character string with original-device identification character strings assigned to the original identification data.

10. The method according to claim 9, wherein:
in method step b), the comparison of the identification data with the original identification data is effected by ascertaining a coding character string on the basis of the identification data and comparing this with coding character strings ascertained from original identification data.

11. The method according to claim 10, further comprising the steps following method step c):
d) transmitting the result, as to whether the device is a counterfeit, to the capture device.

12. The method according to claim 11, wherein:
the method steps a) and b) are performed automatically by a computing device not belonging to the capture device.

13. The method, according to claim 12, wherein:
at least a part of the capture device is realized as a mobile communication device.

14. The method, according to claim 13, wherein:
the method steps a) and b) are performed by the capture device.

15. A method of producing a device according to claim 1, comprising the steps of:
injection-molding the plastic housing element by means of a plastic injection-molding machine, such that a plastic housing wall of the plastic housing element is realized;
said identification elements are concomitantly injected into the plastic housing wall, in a region of the plastic housing wall, for the purpose of realizing said device identification region integrated into the plastic housing wall and realizing a constituent part of the plastic housing wall;
wherein those said identification elements that realize part of a surface of the plastic housing wall further being said device identification elements; and
the device identification region being realized individually for the device by means of the device identification elements, such that the device can be unambiguously identified by means of the device identification region.

16. The method according to claim 15, further comprising the step of:
removing a surface layer by abrasion, in the device identification region.

17. The method according to claim 16, further comprising the steps of:
providing a functional component;
arranging the plastic housing element and the functional component in relation to each another in such a manner that the plastic housing element realizes at least part of a housing for the functional component.

* * * * *